United States Patent [19]

Kramer

[11] 4,421,788

[45] Dec. 20, 1983

[54] METHOD AND APPARATUS FOR COATING A SUBSTRATE WITH FOAMED PLASTIC

[75] Inventor: Fritz Kramer, Newport Beach, Calif.

[73] Assignee: Sanifoam, Inc., Costa Mesa, Calif.

[21] Appl. No.: 351,027

[22] Filed: Feb. 22, 1982

[51] Int. Cl.³ .............................................. B05D 1/02
[52] U.S. Cl. .................................... 427/136; 427/421; 427/426; 239/601; 405/129
[58] Field of Search ................... 239/8, 601, 592, 597, 239/594, 398; 405/129; 118/323; 427/136, 421, 426

[56] References Cited

U.S. PATENT DOCUMENTS

| 2,116,863 | 5/1938 | Dinley | 239/594 |
| 3,199,790 | 8/1965 | Giesemann | 239/428 |
| 4,213,936 | 7/1980 | Lodrick | 239/416.1 |

Primary Examiner—Shrive P. Beck
Attorney, Agent, or Firm—Auslander & Thomas

[57] ABSTRACT

Plastic foam is expelled from a slit-shaped nozzle under high enough pressure to break the plastic foam into generally discrete particles which are propelled toward a surface to be coated with foam at a relatively high velocity. Upon striking the surface, the particles exhibit good adhesion and mechanically key into the substrate upon which they impact. The invention is particularly useful for coating the surface of a landfill for daily sealing of the upper surface thereof.

4 Claims, 4 Drawing Figures

METHOD AND APPARATUS FOR COATING A SUBSTRATE WITH FOAMED PLASTIC

BACKGROUND OF THE INVENTION

The present invention relates to a sealing cover for landfill and, more particularly, to a plastic foam cover for landfill.

In the United States, municipal, state and/or federal regulations govern the operation of landfills which receive garbage deposits during the day. A common requirement for such regulations includes covering the day's deposit of garbage with a layer of compacted earth approximately six inches deep to prevent, among other things, the escape of odors and blowing paper, the proliferation of pests, such as flies, rodents and birds and the leaching of toxic or disagreeable components from the garbage.

This task of placing and compacting the earth cover represents a very significant fraction of the cost of operating a landfill employing, as it does, significant labor and heavy equipment.

Such compacted earth cover performs its principal function for only a day or so. That is, each day's layer of garbage is covered at the end of the day and further layer of garbage with compacted earth topping is deposited in the following day.

Besides the cost of applying the compacted earth cover, it is recognized that multiple layers of earth fill used in this way tend to consume a significant volume of landfill which might otherwise be used for receiving garbage. As is well known, many areas are rapidly using up their available landfill acreage and any reduction in use rate of the landfill volume is desirable.

Various types of plastic foam have been in use for such applications as building insulation, etc. Common types of plastic foam include, for example, foam made by the Isoschaum process described in U.S. Pat. No. 2,860,856 wherein a foaming mixture of a foaming agent solution and air is formed and this mixture is then, in turn, mixed with a liquid synthetic resin such as precondensate of urea and formaldehyde. The resulting foam is then cured by a curing accelerator for the resin such as, for example, oxalic or other acid, which is added to the foam just before it is expelled from the apparatus so that the foam tends to cure and harden very soon after it is deposited.

Typically an air pressure of between about 55 and about 85 pounds per square inch is employed both for the formation of foam bubbles and also for urging the foam and hardening agent from the apparatus. The applicant has discovered that the prior art apparatus is capable of applying a layer of foam having a minimum thickness of about two inches on a substrate. When thus applied, such a layer of foam is capable of preventing the escape of gases and loose paper as well as performing the other desirable functions of a compacted layer of topsoil. However, a two-inch layer of a typical foam which is delivered at a rate of about two to two and a half cubic feet per minute, although effective, does not have the type of economic advantage over compacted topsoil that the applicant wishes to obtain. In addition, foam produced in the manner of the prior art hereinabove described tends to fora a layer upon the substrate garbage rather than penetrating into and filling crevices, etc. Thus, little or no mechanical keying of the foam layer into an uneven substrate is obtained. Thus, separation of the foam layer from the substrate is possible, and the foam layer tends to bridge air spaces below it thus tending to reduce the weight-bearing capability of the layer.

In addition to the preceding, a maximum delivery rate of two to two and a half cubic feet per minute limits the application rate of a two-inch layer of foam by one person to about 12 or 15 square feet per minute. Thus to cover a typical landfill area of 4,000 feet would take between 4.5 and 5.5 hours for one man.

OBJECTS AND SUMMARY OF THE INVENTION

Accordingly, it is an object of the present invention to provide a method and apparatus for delivering a layer of plastic foam to a substrate which overcomes the drawbacks of the prior art.

It is a further object of the invention to provide a method and apparatus for sealing a sanitary landfill with a layer of plastic foam.

It is a further object of the invention to provide an apparatus and method for applying a layer of plastic foam to the surface of a sanitary landfill which is economically competitive with the use of a layer of compacted topsoil.

It is a further object of the invention to provide an apparatus and method for delivering a layer of plastic foam to a substrate which substantially reduces the man hours required for application thereof.

According to an aspect of the present invention, there is provided an apparatus for coating a substrate with a hardenable foam comprising means for producing a hardenable foam containing bubbles of a gas, a nozzle including an opening, means for delivering the foam under pressure of the gas to the nozzle, the openin providing a constriction to flow of the foam therethrough, and the pressure of the gas being effective to expel the foam from the opening and to break up the foam into a plurality of discrete, high-speed particles which strike and adhere to the substrate.

According to a further aspect of the present invention, there is provided a method of coating a substrate with a hardenable foam comprising the steps of producing a hardenable foam containing bubbles of gas, delivering the hardenable foam through a nozzle under a gas pressure effective to break up the foam into a plurality of discrete, high-speed particles, and directing the high-speed particles toward the substrate.

According to a feature of the present invention, there is provided an apparatus for sealing a surface of a landfill comprising means for forming a hardenable plastic foam, the means for forming being effective to form air bubbles in the hardenable plastic foam at a pressure of at least 100 pounds per square inch, a nozzle having a slot therein directable toward the surface, a conduit for delivering the foam from the means for forming to the nozzle, the slot and the pressure being effective to break up the foam as it exits the slot into a high-speed flow of substantially discrete particles which impact and adhere to the substrate.

According to a further feature of the present invention, there is provided a method of sealing a surface of a landfill with a layer of hardened plastic foam comprising the steps of forming a hardenable plastic foam under a gas pressure, expelling the hardenable plastic foam through a slit toward the surface, forming the slit and producing a value of the gas pressure effective to break up the hardenable plastic foam expelled through the slit into a high-speed spray of discrete particles of foam which impact on and adhere to the surface, and permitting the hardenable plastic foam to harden on the surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
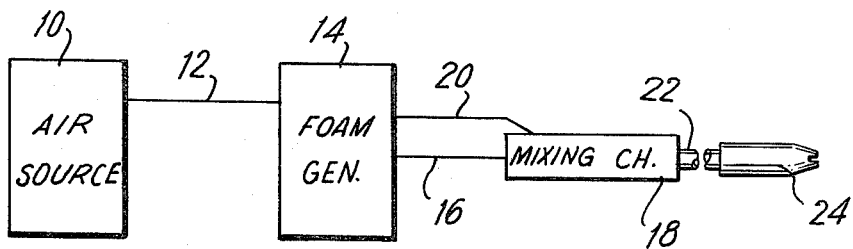
FIG. 1 is a schematic view of apparatus including an embodiment of the present invention.

Referring now to FIG. 1, there is shown an apparatus employing an embodiment of the present invention. An air source 10 which may be, for example, an air storage reservoir optionally provided with a power-driven pump, provides a supply of air pressure on a line 12 to a foam-generating apparatus 14 which may be of any suitable type in the prior art capable of delivering a plastic foam therefrom which can be cured to provide a rigid or semi-rigid foam. Although the exact nature of the foam and its generation is not a limiting element in the present invention, for purposes of concreteness, it will be assumed that foam generator 14 constitutes a part of an apparatus suitable for practicing the Isoschaum process such as described in the references U.S. patent. A foam to be hardened is delivered on a line 16 from foam-generating apparatus 14 to a mixing chamber 18. A hardening agent from foam-generating apparatus 14 is applied through a line 20 to mixing chamber 18. The mixed foam and hardening agent are delivered through a flexible conduit 22 to a nozzle 24.

Figure 4:
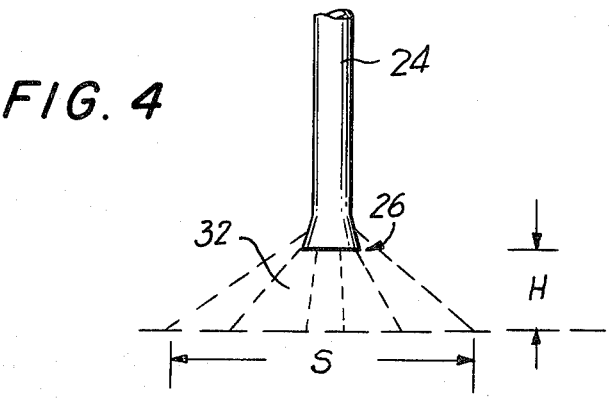
FIG. 4 is a view of a nozzle according to the present invention in its operative position with respect to a surface being coated.
Figure 2:
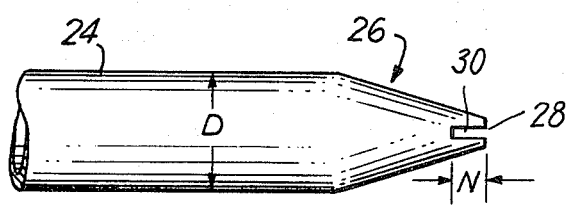
FIG. 2 is a side view of a nozzle according to an embodiment of the invention.
Figure 3:
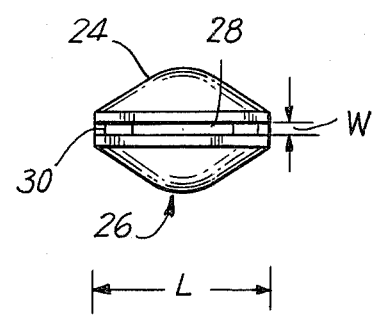
FIG. 3 is an end view of the nozzle of FIG. 2.

Referring now to FIGS. 2, 3 and 4, nozzle 2 consists of a pipe, which in the preferred embodiment, is about one or two feet long with a diameter D of about 1.5 inches. An outer end 26 is flattened to leave a slit 28 having an appropriate width W of about 3/16 of an inch and a length L of about 2.5 inches.

As will be apparent from the description of operating conditions hereinafter described, width W and length L may be changed from the nominal values given above in a manner to satisfy the operating limitations fully disclosed herein.

Notches 30 having a width equal to the width W are cut back for a distance N in the sides of outer end 26 and communicating with slit 28. The distance N is preferably about one inch for the specific parameters herein described.

Although outer end 26 is shown in FIG. 4 to terminate in a straight line at right angles to an axis of nozzle 24, outer end 26 may be given any convenient radius or other shape (not shown) required to give a desired coverage contour.

During delivery of foam, nozzle 24 is moved in the vertical position like a broom delivering a fan-shaped spray 32 of foam from a nozzle height H of about 1 to 1.5 feet. When used in the fashion described, fan-shaped spray 32 covers a swath S of about 3 to 3.5 feet.

Referring momentarily to FIG. 1, the pressure of air available from air source 10 is in excess of 100 psi and preferably in excess of 125 psi. With such pressures, foam exits nozzle 24 at a high enough velocity so that fan-shaped spray 32 consists, not of a sheet of foam, but of individual particles of foam travelling at high speed toward the substrate. Although the applicant does not intend to be limited by a particular theory which describes the break up of foam into discrete particles, the fact that the foam exits nozzle 24 at high velocity passing from a region of high pressure (in excess of 100 psi) to a region of atmospheric pressure in a short time may encourage explosive decompression of some of the bubbles forming the foam enhancing, or being the principal element in the break up of the foam into small particles.

The applicant has further discovered that increasing the pressure beyond 100 psi provides continued improvement up to, and including 160 psi which was the limit of the capacity of the equipment then available. This leads the applicant to believe that pressures even higher than 160 psi will provide even better results in terms of uniformity of coverage and keying to a substrate. However, the use of equipment employing a pressure in excess of 150 psi is governed by safety regulations which makes such use less desirable. This should not mean, however, that one skilled in the art, finding that higher pressures provide improved performance should be free to change nozzle dimensions while employing substantially higher pressures than 160 psi without falling under the present invention.

EXAMPLE

A plastic foam produced from 50 gallons of foam-generating resin and 45 gallons of foaming agent were produced to generate 350 cubic feet of foam. This foam was enerated and delivered employing an air pressure of 125 psi. One worker coated the surface of a sanitary landfill measuring approximately 4,000 square feet with a layer of foam averaging about one inch in thickness in a period of about 25 minutes. A wind estimated to reach 25 miles per hour at times during the coating process did not interfere with the adhesion or coverage. The foam coating appeared to have considerably higher density and lower porosity than foam generated and delivered at normal pressure. This increased density may have resulted from air loss from the foam due to explosive decompression as it exited the nozzle and also air loss due to high velocity impact of the foam with the substrate. The foam keyed into irregularities in the substrate including even flexible portions of the substrate such as paper. On smooth areas of the substrate, a layer as thin as ¼ inch was feasible.

According to the experiment, the applicant has succeeded in providing an apparatus and method for coating a sanitary landfill which uses one-half the foam required employing the teachings of the prior art and which reduces the time required to coat a given surface area by a factor of 10.5 to about 13.3.

The actual design of nozzle 24 and the way in which nozzle 24 is moved with respect to the substrate to deliver foam should not be taken as limiting. For example, nozzle 24 may be designed to emit a fan-shaped spray of foam from its side whereby nozzle 24 may be held generally horizontally and swung back and forth in an arc as the worker moves away from the coated area. In addition, it is within the contemplation of the present invention that the apparatus may be mounted on a mobile platform such as a tractor or trailer carrying the foam-generating apparatus and one or more nozzles oriented for delivery of foam to the substrate as the vehicle moves. This provides the possibility of coating a swath far in excess of about three feet and doing such coating at a higher linear velocity than is feasible with a workman on foot. It would be clear to the routineer, in the light of the present disclosure, that higher flow rates of foam, possibly requiring nozzles with greater slit widths and length may be necessary in order to deliver foam at a sufficiently high rate to satisfy the requirements of vehicle-mounted delivery. This type of delivery may also require substantially higher air pressure and it would be a matter of practically no experimentation to determine a satisfactory compromise between air pressure, nozzle outlet dimensions and material feed rate appropriate for any possible delivery scheme.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A method of sealing a surface of a landfill with a layer of hardened plastic foam comprising the steps of:
   forming a hardenable plastic foam under a gas pressure;
   expelling said hardenable plastic foam through a slit toward said surface;
   forming said slit and producing a value of said gas pressure effective to break up said hardenable plastic foam expelled through said slit into a high-speed spray of discrete particles of foam which impact on and adhere to said surface; and
   permitting said hardenable plastic foam to harden on said surface.

2. Method for sealing a surface of a landfill with a hardenable plastic foam including:
   forming a hardenable plastic foam containing bubbles of gas in said foam at a pressure of at least one hunred pounts per square inch;
   forcing said hardenable plastic foam through a nozzle having a slot therein directable toward said surface; said slot including at least one notch;
   said means for forming said hardenable plastic foam including a conduit for delivering said foam under pressure of said gas from said means for forming to said nozzle;
   said slot providing a constriction to flow of said foam therethrough; and
   wherein said pressure of said gas is effective to expel said foam from said slot and to break up said foam as it exits from said slot into a flow of a plurality of substantially discrete high-speed particles in a fan shape which strike and adhere to said substrate.

3. Apparatus according to claim 2 wherein said pressure is from about one hundred twenty-five to one hundred sixty pounds per square inch.

4. Apparatus according to claim 2 wherein said gas is air.

* * * * *